June 17, 1924.
H. R. WHITTIER
OVEN THERMOMETER
Filed March 23, 1922
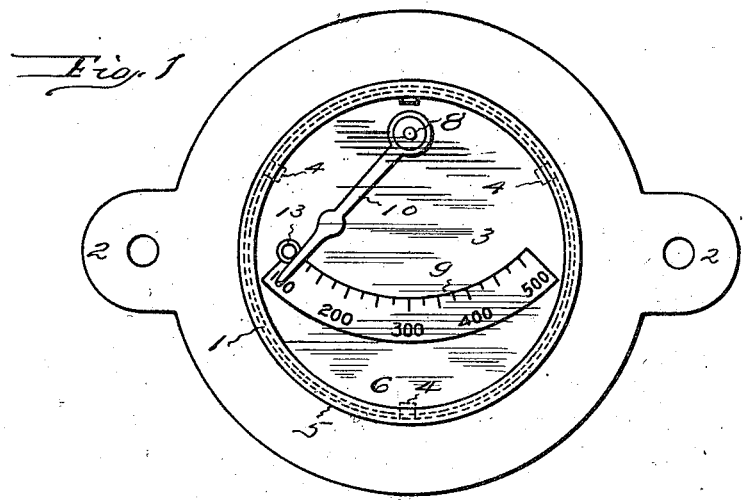
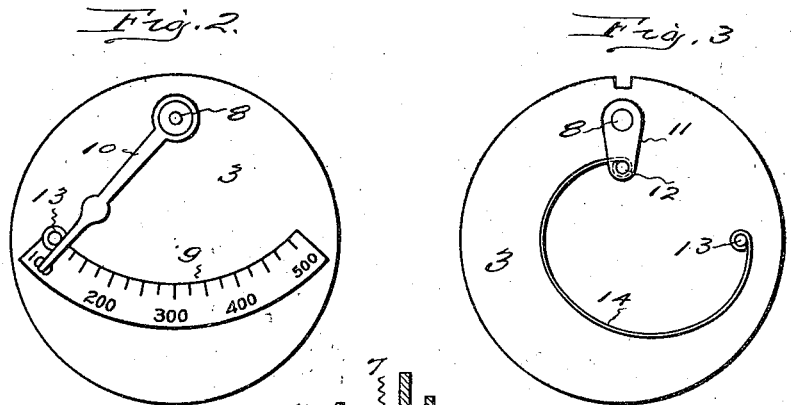
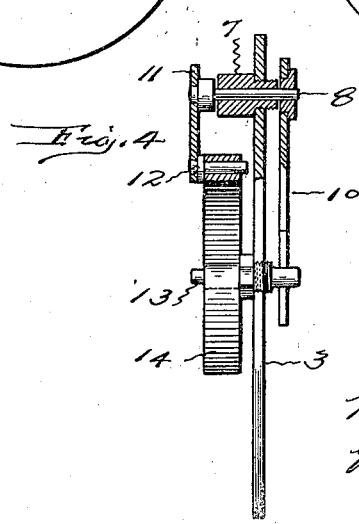
INVENTOR
Horace R. Whittier
by Harry R. Williams
ATTORNEY Patented June 17, 1924.

1,498,413

UNITED STATES PATENT OFFICE.

HORACE R. WHITTIER, OF PLYMOUTH, CONNECTICUT.

OVEN THERMOMETER.

Application filed March 23, 1922. Serial No. 546,034.

*To all whom it may concern:*

Be it known that I, HORACE R. WHITTIER, a citizen of the United States, residing at Plymouth, in the county of Litchfield and State of Connecticut, have invented a new and useful Improvement in Oven Thermometers, of which the following is a specification.

This invention relates to those devices which are designed to be fastened in the doors or walls of ovens for indicating the temperature therein.

The object of the invention is to provide an efficient and reliable heat indicator of this character which has few parts, is simple to assemble, easy to adjust, and very compact and in which the thermo-responsive mechanism and indicating means are constructed as a unit that is independent of the enclosing case.

In attaining this object the termo-responsive mechanism and indicating means are mounted on the dial plate, the thermal strip being on one side and the pointer on the other side with the connecting spindle passing through the dial plate, which dial plate with all the active parts assembled thereon is dropped into the protecting casing that is shaped to protect the mechanism and afford means for securing it in place in the opening provided in the door or wall of the oven.

In the accompanying drawings Figure 1 shows a front view of a thermometer which embodies the invention. Fig. 2 shows a front view of the dial plate and pointer carried thereby. Fig. 3 shows a back view of the dial plate and the thermo-responsive mechanism mounted thereon. Fig. 4 shows enlarged an edge view with part in section, of the dial plate and the thermo-responsive mechanism and indicating means.

The casing 1 of the device shown is formed of thin sheet metal stamped to shape. The back of the casing which is permanently closed is commonly provided with perforated ears 2 by means of which it may be fastened in place. The dial plate 3 that is desirably formed of a disk of metal enamelled on the front side and marked with the required scale, is set in the circular body of the casing upon lugs 4 which are pressed in from the wall of the casing for the purpose. A cap 5 with a glass 6 is set over the open end of the casing for closing it and also holding the dial plate in place.

A sleeve 7 is threaded through the dial plate near one edge. Extending loosely through this sleeve is a spindle 8. Fastened on the front end of the spindle so as to swing across the scale 9 on the face of the dial as the spindle rotates is a pointer 10. Fastened on the rear end of the spindle is an arm 11. Connected with a pin 12 extending toward the dial plate from the swinging end of this arm and with a stud 13 that is set into the dial plate is a curved bi-metallic thermo-responsive strip 14 of commen composition. When this strip expands and contracts under varying temperatures the arm is oscillated and the spindle turned so as to swing the pointer back and forth over the scale on the front of the dial. The thermo-responsive strip is calibrated and curved in such manner as to cause the pointer to normally rest against the stud which extends through the dial plate and forms a stop for the pointer in front as well as an anchor for one end of the thermo-responsive strip in back of the plate.

The dial plate with the sleeve supporting the spindle which is actuated by the curved thermal strip on the back and which carries the pointer on the front, forms a unit of few parts which are cheaply made and easily assembled ready to be dropped into a casing of any suitable shape. This unitary mechanism being entirely independent of the case there can be no misalignment and binding of the parts owing to errors of manufacture. It is easy to calibrate the strip thus mounted on the back of the dial and to adjust the pointer on the front of the dial. With this construction the case may be made very shallow as the strip lies close to the dial plate on the back and the pointer lies close to the dial plate on the front. The spindle is retained from longitudinal displacement by the pointer in front and the arm in back, and the thermal strip is held from displacement at one end between the arm and back of the plate, and at the other end between the plate and the casing into which this unitary mechanism is dropped.

The invention claimed is:

1. An oven thermometer comprising a dial plate, a spindle extending through and supported by the dial plate and carrying a pointer in front of the dial plate and an arm in back of the dial plate, a curved thermo-static strip with one end pivotally connected to said arm and the other end pivotally connected to and supported by the dial plate, and a casing adapted to receive and enclose the said dial plate and thermo-responsive mechanism and indicating means supported thereby.

2. An oven thermometer comprising a dial plate, a sleeve extending through and supported by the dial plate, a spindle rotatably mounted in the sleeve, a pointer attached to the spindle in front of the dial plate, an arm attached to the spindle in back of the dial plate, a curved thermo-responsive strip with one end pivotally attached to the arm and the other end pivotally attached to the dial plate, and a casing adapted to receive and enclose said plate and thermo-responsive mechanism and indicating means.

3. An oven thermometer comprising a dial plate, a sleeve screwed into the dial plate, a spindle extending through the sleeve, a pointer fastened to the spindle in front of the dial plate, an arm fastened to the spindle in back of the dial plate, a stud extending through the dial plate, a thermo-responsive strip with one end connected with the arm and the other end connected with the stud, said stud in front of the dial plate forming a stop for limiting the movement of the pointer in one direction, and a casing adapted to receive and enclose said dial plate and the parts which it carries.

4. A unitary thermo-responsive mechanism and indicating means for an oven thermometer comprising a dial plate, a sleeve extending through the dial plate, a spindle loosely supported by the sleeve, a pointer attached to one end of the spindle, an arm attached to the other end of the spindle, a pin extending from the arm, a stud extending through the dial plate, and a curved thermo-responsive strip with one end loosely connected with the pin and the other end loosely connected with the stud.

HORACE R. WHITTIER.